United States Patent

[11] 3,588,140

| [72] | Inventor | Richard Chute |
| | | Huntington Woods, Mich. |
| [21] | Appl. No. | 735,699 |
| [22] | Filed | June 10, 1968 |
| [45] | Patented | June 28, 1971 |
| [73] | Assignee | Eaton Yale & Towne Inc. |
| | | Cleveland, Ohio |

[54] INFLATABLE VEHICLE SAFETY APPARATUS
10 Claims, 3 Drawing Figs.

| [52] | U.S. Cl. | 280/150 |
| [51] | Int. Cl. | B60r 21/08 |
| [50] | Field of Search | 280/150, |
| | | 150 (AB) |

[56] References Cited
UNITED STATES PATENTS

| 3,477,740 | 11/1969 | Hass | 280/150 |
| 2,834,606 | 5/1958 | Bertrand | 280/150 |
| 2,834,609 | 5/1958 | Bertrand | 280/150 |
| 3,197,234 | 7/1965 | Bertrand | 280/150 |
| 3,413,013 | 11/1968 | Wissing et al. | 280/150 |
| 3,451,693 | 6/1969 | Carey | 280/150 |

*Primary Examiner*—Kenneth H. Betts
*Attorney*—Yount, Flynn & Tarolli

ABSTRACT: A vehicle safety apparatus includes an inflatable confinement and means for inflating the confinement in such a manner that at least one portion of the confinement abuttingly engages a part of a vehicle before another portion of the confinement engages an occupant of the vehicle.

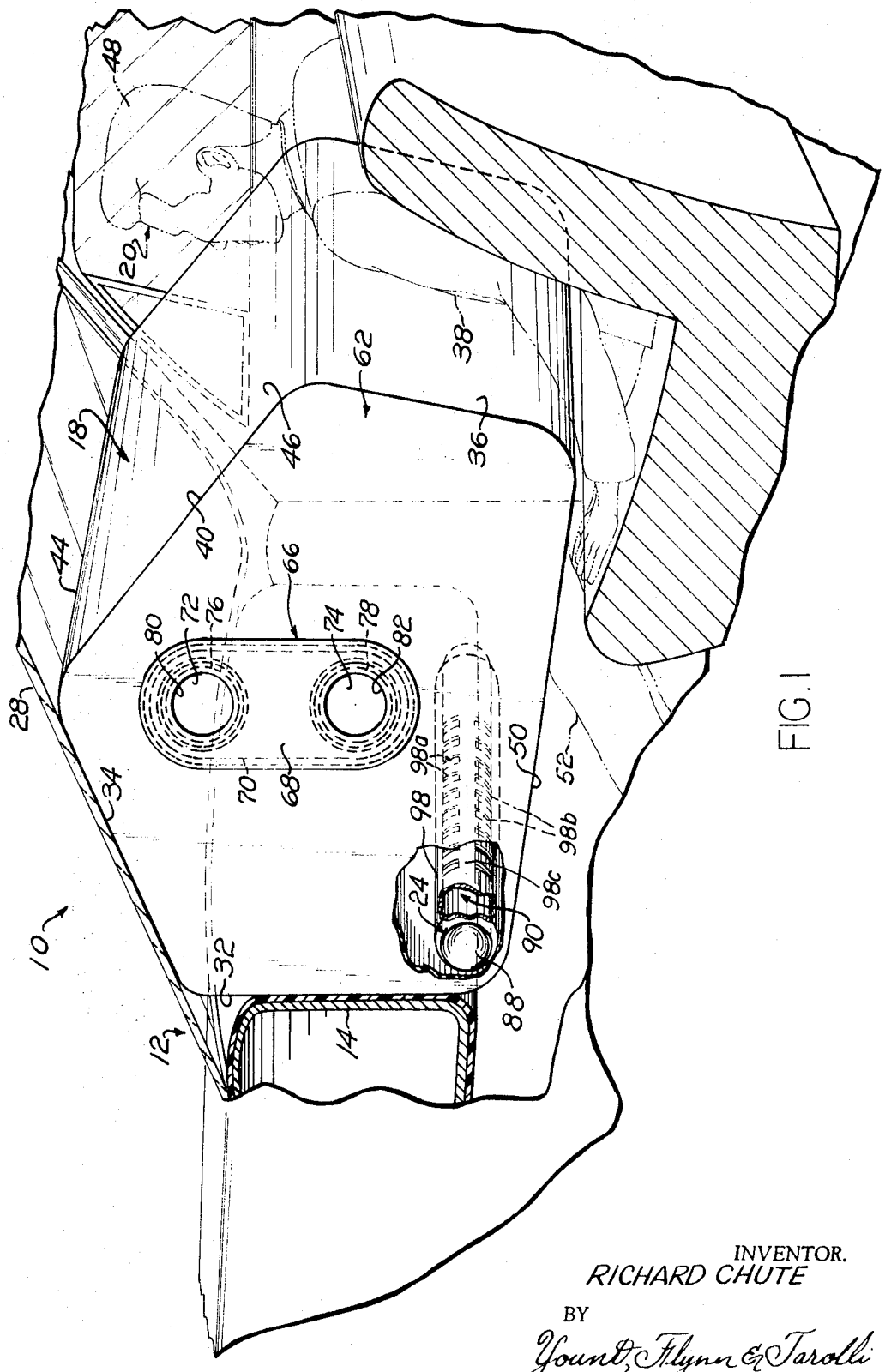

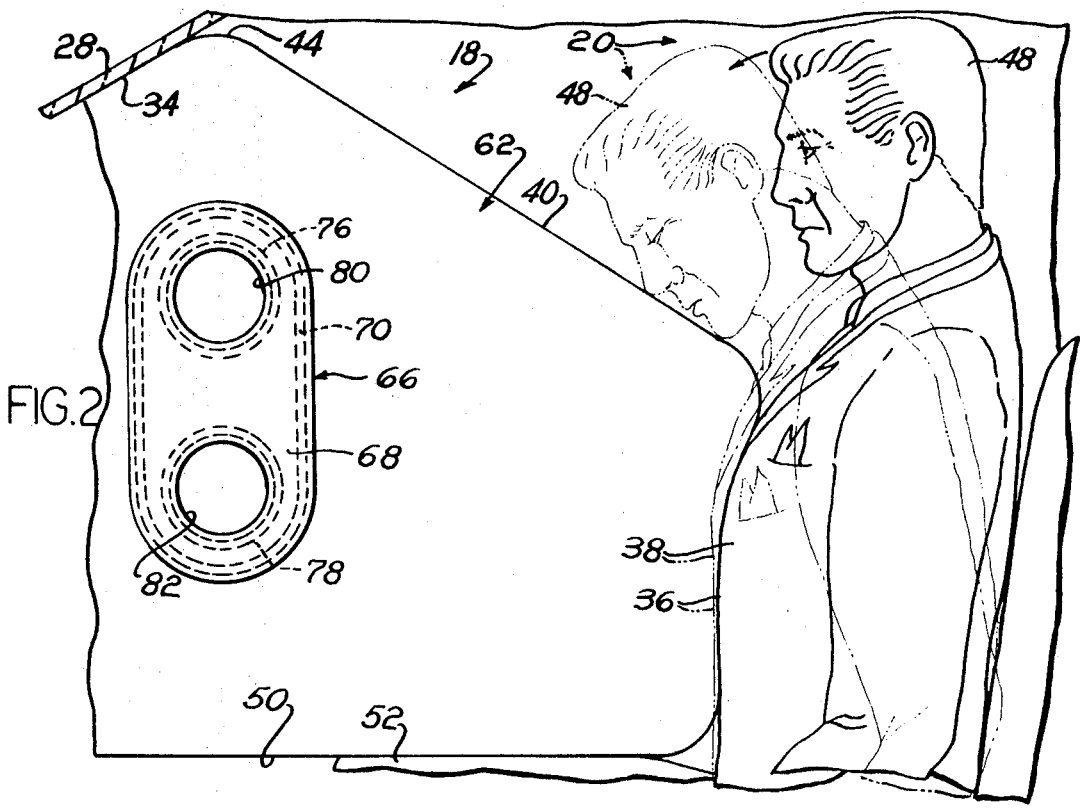
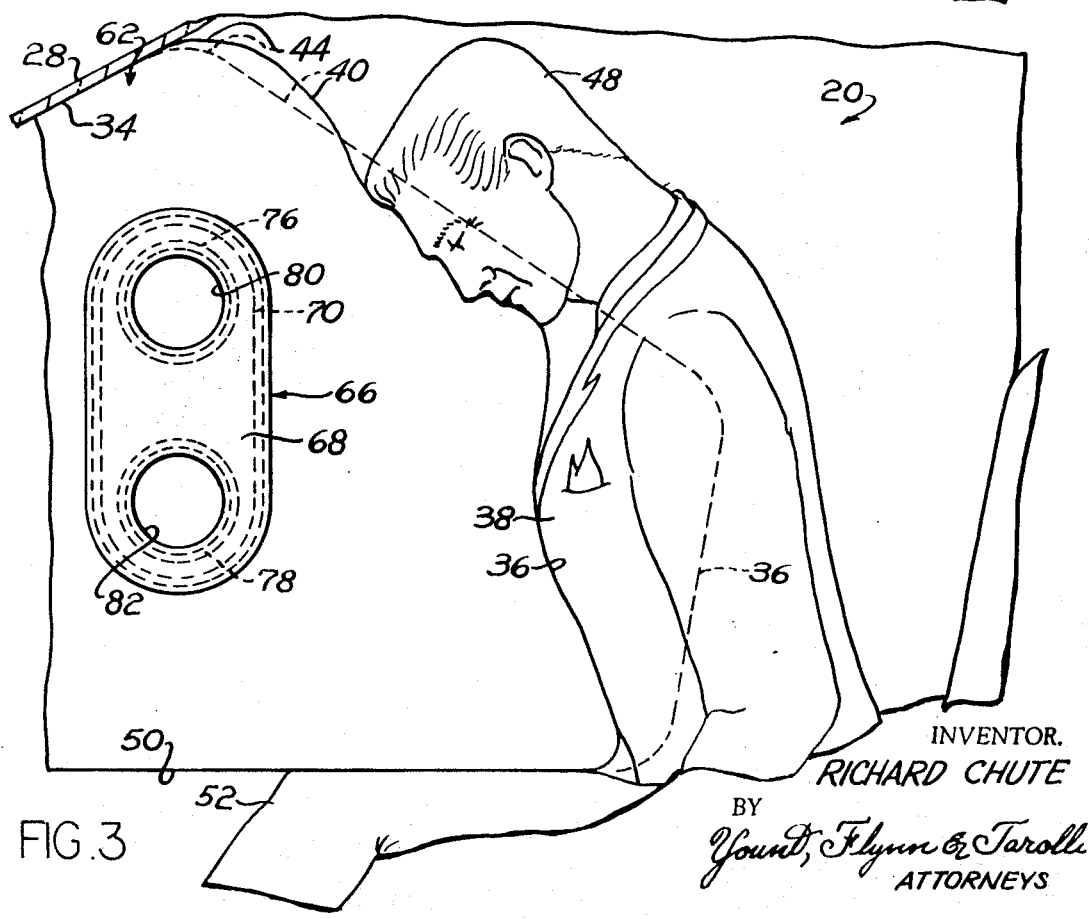

INFLATABLE VEHICLE SAFETY APPARATUS

Known inflatable confinements for protecting an occupant of a vehicle during a collision are expanded into engagement with the occupant. This subjects the occupant to substantial impact forces by the partially inflated confinement. In addition, under certain collision conditions this manner of expanding the confinement allows the occupants of the vehicle to move over an upper portion of the confinement and to hit parts of the vehicle before the confinement is fully inflated. Moreover, known confinements do not make provision for the fact that the head of the occupant is substantially lower in weight per unit of area than the torso of the occupant and that in restraining movement of the occupant relative movement between the head and torso could occur which would result in injury to the occupant, particularly in the area of the neck.

Accordingly, it is an object of this invention to provide a new and improved vehicle safety apparatus which includes a confinement which is constructed to minimize the tendency of the occupant to move upwardly over the confinement and at the same time minimize the possibility of injury due to relative movement of the torso and head of the occupant.

Another object of the present invention is to provide a new and improved vehicle safety apparatus which includes a confinement which is expanded and engages a part of the vehicle and an occupant of the vehicle and applies a downward force to the occupant tending to hold the occupant in the seat.

Another object of this invention is to provide a new and improved vehicle safety apparatus including a confinement, means for providing a flow of fluid for effecting expansion of the confinement from a collapsed condition to an expanded condition upon the occurrence of the collision, and a flow directing means for directing the flow of fluid to expand the confinement from the collapsed condition to the expanded condition in such a manner as to bring one portion of the confinement into engagement with a part of the vehicle before another portion of the confinement, located at least in part below the one portion, engages an occupant of the vehicle.

Another object of the present invention is the provision of a new and improved vehicle safety apparatus which includes a confinement which when inflated permits forward movement of the occupant's head while restraining the occupant's torso and then restrains the occupant's head and torso whereby the torso will then move forwardly with respect to the head due to the higher weight of the torso and as a result the possibility of the head being bent backward relative to the torso is minimized, and wherein exhaust means is provided for exhausting fluid from the confinement to minimize rebound of both the torso and the head.

Another object of this invention is to provide a new and improved vehicle safety apparatus, in accordance with the preceding paragraph, wherein the means for providing a flow of fluid includes flow directing means for directing the flow of fluid in such a manner as to inflate the confinement from the collapsed condition to a substantially expanded condition before the first portion of the confinement engages the torso of the occupant of the vehicle.

Another object of this invention is to provide a new and improved vehicle safety apparatus including a confinement having a collapsed condition and an expanded condition in which the confinement engages an occupant of the vehicle to restrain movement of the occupant as a result of a collision, the confinement includes a pair of five-sided end panels which are interconnected, and wherein the confinement has a first portion adapted to engage one part of the vehicle, a second portion adapted to engage another part of the vehicle, a third portion adapted to engage the torso of the occupant of the vehicle, a fourth portion adapted to be engaged by the head of the occupant of the vehicle, and a fifth portion adapted to engage the legs of the occupant of the vehicle.

These and other objects and features of the invention will become more apparent upon a consideration of the following description taken in connection with the accompanying drawing wherein:

FIG. 1 is a schematic fragmentary illustration showing a confinement forming a preferred embodiment of the invention in an expanded condition to restrain movement of an occupant of a vehicle during a collision;

FIG. 2 is a schematic illustration showing the movement of an occupant of the vehicle relative to the confinement immediately after a collision; and FIG. 3 is a schematic illustration showing the relationship of the occupant of the vehicle to the confinement a short time after the collision.

The present invention provides an improved vehicle safety apparatus. The vehicle safety apparatus of the present invention includes an inflatable confinement having an inoperative collapsed condition and an operative expanded condition. Upon the occurrence of a collision, an inflation assembly within the confinement is operable to inflate the confinement so as to first engage a part of the vehicle and then an occupant of the vehicle when the confinement is in a substantially expanded condition. This sequence of expansion results in the confinement being positioned and stabilized by engagement with the part of the vehicle before restraining movement of the occupant under the influence of forces resulting from the collision. The confinement has a configuration such that one portion of the confinement engages and retards forward movement of the torso of the occupant while the head of the occupant is free to move forwardly of the torso before engaging the confinement to thereby prevent neck injuries. The vehicle safety apparatus embodying the present invention may be utilized in vehicles of many different types, such as automobiles, airplanes, and trucks.

As representing a preferred embodiment of the invention, a vehicle safety apparatus 10 is illustrated in an automotive vehicle 12. The vehicle safety apparatus 10 may be associated with different parts of the automotive vehicle and may be mounted in the back of the front seat or in various locations in the automotive vehicle. As illustrated, the vehicle safety apparatus 10 is located in association with the dashboard 14 of the vehicle 12.

The vehicle safety apparatus 10 includes a confinement 18 which has a collapsed or contracted condition (not shown) and an expanded condition which is shown in FIG. 1. When the confinement 18 is in the contracted condition, the confinement is compacted closely adjacent to an inflation assembly 24 which extends transversely of the confinement and is secured to the dashboard 14. Upon the occurrence of the collision, the inflation assembly 24 is operated to release fluid under pressure to inflate the confinement 18 from the contracted condition to the expanded condition. When the confinement 18 is in the expanded condition, it has a generally polygonal shape, with one axis of the confinement extending generally parallel to the dashboard of the vehicle 12 and to the front seat of the vehicle. The expanded or inflated confinement 18 extends transversely of the vehicle between the steering wheel of the vehicle and the door on the passenger side of the vehicle so as to have an extent when inflated which is approximately equal to the extend of the front seat of the vehicle between the steering wheel and the door of the vehicle. In view of the size, the confinement 18 is operable to restrain the movement of a plurality of occupants located in the front seat of the vehicle in a position similar to that of the occupant 20.

The confinement 18 is inflated from a contracted condition to the expanded condition by the inflation assembly 24 in such a manner as to substantially expand the confinement and to position and partially stabilize the confinement before it engages the occupant or occupants of the vehicle. To this end, side portions of the confinement are brought into abutting engagement with parts of the vehicle before a side portion of the confinement engages an occupant of the vehicle. This order or sequence of expansion of the confinement 18 stabilizes the confinement in its operative position before a load is applied to the confinement to prevent the confinement from being overridden by the occupant 20. In addition, this order or sequence of expansion prevents the confinement from hitting and thereby injuring the occupant of the vehicle under the influence of the flow of fluid before the confinement is substantially expanded.

Once inflated in the manner previously described, the confinement remains in its operative position since it is pressed against the parts of the vehicle simultaneously with the engagement of the occupant 20 with the confinement to thereby transmit forces between the occupant 20 and the parts of the vehicle through the fluid medium within the confinement to resist forward and upward movement of the occupant 20. If the confinement 18 was expanded in such a manner as to engage the occupant 20 before engaging parts of the vehicle, movement of the occupant 20 under the influence of collision forces could result in the confinement 18 being moved or pivoted in such a manner as to enable the occupant 20 to override or move about the confinement and into engagement with a windshield 28 or other part of the vehicle. Also, if the confinement engaged the occupant of the vehicle before it was substantially expanded, the impact force of the confinement against the occupant could result in serious injury.

Accordingly, the confinement 18 is expanded by the inflation assembly 24 in such a manner as to bring a first or forward side portion 32 of the confinement and a second or forward upper side portion 34 of the confinement into abutting engagement with the dashboard 14 and windshield 28, respectively, before a third or rearward side portion 36 engages the torso 38 of the occupant 20 of the vehicle. The order of expansion insures that the confinement 18 is substantially expanded before the side portion 36 engages the occupant 20. The side portions 34 and 36 are interconnected by a rearward upper side portion 40 which extends at obtuse angles to the side portions 34 and 36 and intersects them at rounded corners 44 and 46. While the side portion 40 is spaced from the head 48 of the occupant 20 when the occupant is seated in an upright position, the head 48 of the occupant moved forwardly and downwardly to engage the side portion 40 upon the occurrence of a collision (see FIG. 2 and 3). A fifth or bottom side portion 50 interconnects the side portions 32 and 36 and is adapted to engage the lap or legs 52 of the occupant 20.

Upon the occurrence of a collision, fluid under pressure flows from the inflation assembly 24 into the collapsed confinement 18. This flow of fluid quickly inflates the confinement by first moving the side portions 32 and 34 into engagement with parts 14 and 28 of the vehicle (see FIG. 1). Then the side portion 36 engages the torso 38 of the occupant 20. The side portion 36 of the confinement is located below the side portion 34 and acts to apply a downward force on the occupant on inflation. This tends to seat the occupant, and prevents the occupant from overriding the confinement 18.

Assuming that it is a front end collision, the collision causes the torso 38 of the occupant to move forwardly against the side portion 36 of the confinement 18, that is to the position indicated in solid lines in FIG. 2. The confinement 18 then resists further movement of the torso 38 while the head 48 is free to move forwardly toward the side portion 40. Thus, while the torso 38 is subsequently moving forwardly through a relatively small distance to the position indicated in dashed lines in FIG. 2, the head 48 moves forwardly and downwardly so that the face of the occupant 20 is immediately adjacent the surface 40. The head 48 is then pressed against the confinement 18 so that further forward movement of the occupant 20 is resisted by engagement of both the head 48 and the torso 38 with the confinement (see FIG. 3).

The likelihood of serious injury to the neck of the occupant 20, during a front end collision, is substantially reduced by constructing the confinement 20 in such a way that the side portion 40 is spaced apart from the head 48 of the occupant when he is seated in an upright position and the confinement 18 is in its expanded condition (see FIG. 1). The head 48 is lighter in weight per unit of area than the torso 38 so that the confinement 18 more readily retards forward movement of the head than of the torso. Therefore, as the occupant 20 passes into or collapses the confinement 18, the head 48 is moved backward with respect to the torso 38 of the occupant. In order to minimize the possibility of neck injury by this backward movement of the head 48 relative to the torso, the neck of the occupant 20 is bent forwardly to position the head 48 forward of the torso before the head engages the confinement 18 (see the dashed line position of FIG. 2). This relative positioning of the head 48 and torso 38 of the occupant 20 is obtained by constructing the confinement so that the side portion 36 is engaged by the torso 38 before the side portion 40 is engaged by the head 48. The forward movement of the torso 38 is then retarded by the confinement 18 while the head 48 is free to move forward.

Since the side portions 32 and 34 engage parts of the vehicle opposite from the side portion 36 and occupant 20 before the side portion 36 is brought into engagement with the occupant, the confinement is stabilized in its extended operating position before the occupant presses forwardly into the confinement. When the occupant moves forwardly under the influence of collision forces, this movement is immediately resisted by reaction forces applied by the fluid medium within the confinement 18 to the parts of the vehicle, in the present instance the windshield 28 and dashboard 14. Of course, when the confinement 18 is mounted in a location other than on the dashboard 14, the forward side portions of the confinement can be brought into engagement with parts of the vehicle other than the dashboard and windshield.

The side portions 32, 34, 36, 40 and 50 of the confinement 18 are formed by a continuous strip or panel having its end portions connected at a seam extending across the side portion 32 of the confinement. Generally parallel, five-sided end walls 60 and 62 are connected to the side portions of the confinement in a suitable manner, in the present instant by sewing. Thus, it can be seen that confinement has a generally polygonal configuration with five side portions, including the generally parallel side portions 32 and 36 each of which is connected at opposite ends to one of the sides or edges of the end walls 60 and 62.

A pressure responsive means or blowout patch assembly 66 (FIG. 1) is advantageously secured to the end walls 60, 62 of the confinement 18 to minimize rebound of the occupant 20 from the confinement. Only the blowout patch assembly 66 secured to end wall 62 is shown and will be described. The blowout patch assembly 66 includes an outer mounting sheet 68 which is secured to the end wall 62 by stitching 70. A pair of blowout patches or sections 72 and 74 are mounted on an inner side of the sheet 68 by stitching 76 and 78 and are exposed to fluid pressure within the confinement 18. When the pressure within the confinement 18 reaches a predetermined level, the blowout patches 72 and 74 are blown or forced outwardly of the mounting sheet 68 to provide orifices 80 and 82 through which fluid escapes from the confinement. The predetermined pressure may be reached in the confinement due to the flow of fluid from the inflation assembly 24 or due to the engagement of the occupant 20 with the confinement. The resulting outward flow of fluid provides for both the deflation of the confinement 18 and for the adsorption of energy resulting from collision forces on the occupant to minimize rebound of the occupant from the confinement, as is described more fully in copending application Ser. No. 621,846 filed Mar. 9, 1967 (now abandoned).

The inflation assembly 24 (see FIG. 1) includes a reservoir 88 which defines a fluid chamber 90 filled with fluid under pressure. An explosive means is ignited in a known manner by means of current flowing through wires upon the occurrence of a collision to rupture or open the reservoir 88. When the reservoir 88 is opened, fluid under pressure flows outwardly into a space between a diffuser 98 and the reservoir 88. Fluid from the chamber 90 flows axially, in the space between the diffuser 98 and the reservoir 88. The diffuser 98 is provided with a plurality of slots or passages which communicate with the space 90 and direct the outward flow of fluid to expand the confinement 18 in the previously described manner wherein the side portions 32 and 34 engage parts of the vehicle before the side portions 36 and 50 engage the occupant 20 of the vehicle. The slots also direct the flow of fluid in such a manner as to have the confinement 18 substantially expanded before the side portion 36 engages the torso 38 of the occupant 20. In this manner the diffuser 98 causes the confinement 18 to be substantially expanded before the side portion engages the occupant to thereby prevent the occupant from being injured by a straight outward blowing or movement of the uninflated confinement under the influence of the fluid flow from the reservoir 88. The diffuser 98, as shown in FIG. 1, has a first row of slots 98a spaced from a second row of slots 98b by a solid diffuser wall portion 98c, which has no fluid flow openings. The slots 98a have a circumferential extent and are positioned to direct fluid upwardly toward the windshield so that the confinement is expanded into engagement therewith. The row of slots 98b directs the flow generally downwardly, and the portion 98c blocks the flow of fluid directly toward the occupant's torso.

In view of the foregoing description, it can be seen the safety apparatus 10 includes a confinement 18 having five side portions connected to opposite end walls. Upon the occurrence of a collision, an inflation assembly 24 inflates the confinement 18 from a contracted condition to an expanded condition wherein the confinement protects the occupants of the vehicle during a collision by restraining their movements. The confinement 18 is inflated in such a manner that the side portions opposite from the occupant, that is the side portions 32 and 34, are brought into engagement with parts of the vehicle before the confinement is expanded into engagement with the occupant. This manner of expanding the confinement 18 results in reaction forces being applied simultaneously to both parts of the vehicle by pressure within the confinement to restrain the occupant 20 against movement relative to the vehicle when a side portion, that is the side portion 36, of the confinement engages the occupant. This stabilizing of the confinement prevents the occupant from deflecting the confinement from its intended operative position before the confinement is fully inflated by fluid from the inflation assembly 24. The side portion 40 is spaced from the head 48 of the occupant to prevent neck injuries by enabling the head to move into a leading or forward relationship with the torso before engaging the confinement 18. When the pressure within the confinement 18 exceeds a predetermined level, blowout patches 72 and 74 are forced or blown out of a mounting sheet 68. This provides orifices 80 and 82 through which fluid can escape from the confinement to thereby minimize rebounding of the occupant upon a compressing of the fluid within the confinement.

It will be apparent to those skilled in the art that the safety apparatus 10 can be used in many different types of vehicles to protect occupants of the vehicle against injury upon the occurrence of a collision. It is contemplated that the size and shape of the confinement 18 will be adjusted to suit the configuration of the interior of a vehicle in which the safety apparatus 10 is mounted. It is also contemplated that the angular relationship between the sides of the confinement will be varied in accordance with variations in the angular relationship between the parts of the vehicle with which the sides of the confinement are to be brought into engagement upon inflation of the confinement.

I claim:

1. A vehicle safety apparatus comprising a confinement having a collapsed condition and an expanded condition in which said confinement engages an occupant of the vehicle to restrain movement of the occupant as a result of a collision, said confinement including a pair of five-sided end panels, a first portion connected at opposite ends to first sides of said end panels and adapted to engage one part of the vehicle, a second portion connected at opposite ends to second sides of said end panels and adapted to engage another part of the vehicle, a third portion connected at opposite ends to third sides of said end panels and adapted to engage the torso of the occupant of the vehicle, a fourth portion connected at opposite ends to fourth sides of said end panels and adapted to be engaged by the head of the occupant of the vehicle, and a fifth portion connected at opposite ends to fifth sides of said end panels and adapted to engage the legs of the occupant of the vehicle, and means for providing a flow of fluid to effect expansion of said confinement.

2. A vehicle safety apparatus as set forth in claim 1 wherein said means for providing a flow of fluid includes flow directing means for effecting expansion of said confinement in such a manner as to bring said second portion into engagement with the other part of the vehicle before said third portion engages the torso of the occupant of the vehicle.

3. A vehicle safety apparatus as set forth in claim 1 wherein said fourth portion of said confinement is located in a spaced apart relationship with the head of the occupant of the vehicle when said confinement is in said expanded condition and the occupant is sitting in an upright position in the vehicle.

4. A vehicle safety apparatus comprising a confinement having a collapsed condition and an expanded condition, said confinement in said expanded condition engaging a part of a vehicle and the torso of an occupant of the vehicle to restrain movement of the occupant as a result of a collision, means for providing for a flow of fluid to effect expansion of said confinement into engagement with the part of the vehicle before engaging the occupant of the vehicle and then into engagement with the torso of the occupant of the vehicle, said confinement including a first portion for engaging the part of the vehicle, a second portion for engaging the torso of the occupant of the vehicle, a third portion extending between said first and second portions for engaging the head of the occupant of the vehicle, a fourth portion connected to said second portion for engaging the legs of an occupant of the vehicle, a fifth portion connected to said first and fourth portions for engaging a part of the vehicle disposed in an angular relationship with the part of the vehicle engaged by said first portion of the confinement, and a pair of opposite end panels having five angularly related side edges for interconnecting said portions of said confinement.

5. A vehicle safety apparatus as set forth in claim 4 further including means in one of said end panels for providing an orifice means in said one end panel to enable fluid to flow from said confinement when the pressure in said confinement reaches a predetermined level.

6. A vehicle safety apparatus comprising a confinement having a collapsed condition and an expanded condition, means for providing a flow of fluid to effect expansion of said confinement, said confinement having a first portion for engaging an occupant's torso when said confinement is in said expanded condition to restrain movement of such torso as a result of a collision and a second portion extending at an angle to said first portion and located in such an orientation relative to the occupant as to be spaced apart from the head of the occupant when the occupant is in an upright position and to be engaged by the head of the occupant after the torso of the occupant has moved forwardly, means for enabling fluid to flow out of said confinement to minimize rebound of the head and torso from the confinement, said confinement including a third portion connected to said first portion for engaging the legs of the occupant of the vehicle when said confinement is in said expanded condition, forth and fifth portions connected to said second and third portions respectively for engaging angularly related parts of the vehicle when said confinement is in said expanded condition, and first and second five-sided panels located at opposite ends of said confinement and connected to said portions of said confinement.

7. A vehicle safety apparatus comprising a confinement having a collapsed condition and an expanded condition, said confinement when in said expanded condition engaging one part of a vehicle and the torso of an occupant of the vehicle to restrain movement of the occupant as a result of a collision, said confinement remaining in engagement with the one part of the vehicle during at least the initial movement of the occupant relative to the vehicle during a collision, end means for providing for a flow of fluid to effect expansion of said confinement into engagement with the one part of the vehicle before engaging the occupant of the vehicle and then into engagement with the torso of the occupant of the vehicle, said means and said confinement being mounted forwardly of the occupant on another part of said vehicle which is generally opposite the occupant of the vehicle when the occupant is seated, said means having structure for directing fluid into said confinement in a direction toward the one part of the vehicle to effect expansion of said confinement into engagement with the one part before engaging the occupant.

8. A vehicle safety apparatus comprising a confinement having a collapsed condition and an expanded condition, said confinement when in said expanded condition engaging one part of a vehicle and the torso of an occupant of the vehicle to restrain movement of the occupant as a result of a collision, said confinement remaining in engagement with the one part of the vehicle during at least the initial movement of the occupant relative to the vehicle during a collision, and means for providing for a flow of fluid to effect expansion of said confinement into engagement with the one part of the vehicle before engaging the occupant of the vehicle and then into engagement with the torso of the occupant of the vehicle, said means and said confinement being mounted forwardly of the occupant, said means including a diffuser member having passages therein for directing fluid into said confinement in a direction toward the one part of the vehicle to effect expansion of said confinement into engagement with the one part of the vehicle, said diffuser member being mounted on another part of the vehicle which is opposite the torso of the occupant of the vehicle when the occupant is seated, and the one part comprises the vehicle windshield and said passages in said diffuser direct fluid flow toward the windshield.

9. A vehicle safety apparatus as defined in claim 8 wherein said diffuser has a portion directly opposite the torso of the occupant and which portion has no fluid passages therein.

10. A vehicle safety apparatus comprising a confinement having a collapsed condition and an expanded condition, means for providing a flow of fluid to effect expansion of said confinement, said confinement having a first portion for engaging an occupant's torso when said confinement is in said expanded condition to restrain movement of the torso as a result of a collision, and said confinement having a second portion extending upwardly at an angle from said first portion in a direction away from the occupant and terminating adjacent the top of the occupant's head, said second portion being located in such an orientation relative to the occupant as to be spaced from the head of the occupant when the occupant is in an upright position and to be engaged by the head of the occupant after the torso of the occupant has moved forwardly, and means for enabling fluid to flow out of said confinement while said confinement is restraining movement of the head and torso to minimize rebound of the head and torso from the confinement, said first and second portions of said confinement including surfaces which engage and apply a restraining force to the head and torso with a minimum possibility of the head of the occupant being bent rearwardly relative to the torso of the occupant while being restrained by the confinement, said means for providing a flow of fluid including flow directing means for directing said flow of fluid in such a manner as to inflate said confinement from said collapsed condition to a substantially expanded condition before said first portion of said confinement engages the torso of the occupant of the vehicle, said means for providing a flow of fluid including flow directing means for directing said flow of fluid in such a manner as to expand to bring a third portion of said confinement into abutting engagement with a part of the vehicle before said first portion of said confinement engages the torso of the occupant of the vehicle.